United States Patent
Leto

(10) Patent No.: US 9,200,740 B2
(45) Date of Patent: Dec. 1, 2015

(54) PIPING SYSTEM DRAIN DOWN TOOL

(71) Applicant: Michael Angelo Leto, Holbrook, NY (US)

(72) Inventor: Michael Angelo Leto, Holbrook, NY (US)

(*) Notice: Subject to any disclaimer, the term of this patent is extended or adjusted under 35 U.S.C. 154(b) by 67 days.

(21) Appl. No.: 13/766,726

(22) Filed: Feb. 13, 2013

(65) Prior Publication Data

US 2013/0206252 A1  Aug. 15, 2013

Related U.S. Application Data

(60) Provisional application No. 61/598,393, filed on Feb. 14, 2012.

(51) Int. Cl.
*F16L 41/06* (2006.01)

(52) U.S. Cl.
CPC ............ *F16L 41/06* (2013.01); *Y10T 137/6123* (2015.04)

(58) Field of Classification Search
CPC ........... F16L 41/06; F16L 19/00; F16L 41/12; F16L 41/16; F16L 4/041
USPC .......................................... 137/318; 285/197
See application file for complete search history.

(56) References Cited

U.S. PATENT DOCUMENTS

| | | | | |
|---|---|---|---|---|
| 3,298,717 A * | 1/1967 | Rothwell et al. | ............... | 285/197 |
| 3,471,176 A * | 10/1969 | Gilchrist | ........................ | 285/111 |
| 3,734,112 A * | 5/1973 | Finney et al. | .............. | 137/15.13 |
| 3,792,879 A * | 2/1974 | Dunmire et al. | .............. | 285/197 |
| 4,789,189 A * | 12/1988 | Robertson | ..................... | 285/197 |
| 5,577,529 A * | 11/1996 | Katz | ............................. | 137/318 |
| 5,732,732 A * | 3/1998 | Gross et al. | ................... | 137/318 |
| 5,906,048 A * | 5/1999 | Bender | ....................... | 29/890.14 |
| 6,648,377 B2 * | 11/2003 | Marandi | ....................... | 285/197 |
| 7,552,742 B2 * | 6/2009 | Dole | ............................. | 137/318 |
| 7,886,773 B2 * | 2/2011 | Mainzer | ........................ | 138/93 |

\* cited by examiner

*Primary Examiner* — Craig Schneider
*Assistant Examiner* — Kevin Barss
(74) *Attorney, Agent, or Firm* — Sorell, Lenna & Schmidt, LLP

(57) ABSTRACT

A piping system drain down tool allows for a controlled draining of any pipe or piping system in a safe, efficient and professional manner. Current methods for draining piping systems is messy, time-consuming and uncontrolled. The piping system drain down tool includes a boring shaft that can turn to penetrate a pipe clamped into the tool. A seal prevents water from leaking and directs draining water out through the tool and through a valve and a hose connector, where a hose can be connected to direct flow of the draining water. The tool can also be used to create a water supply tap at any location within a water system.

18 Claims, 4 Drawing Sheets

PIPING SYSTEM DRAIN DOWN TOOL

CROSS-REFERENCE TO RELATED APPLICATION

This application claims the benefit of priority of U.S. provisional application No. 61/598,393, filed Feb. 14, 2012, the contents of which are herein incorporated by reference.

BACKGROUND OF THE INVENTION

The present invention relates to plumbing accessories and, more particularly, to a piping system drain down tool.

When a water supply piping system needs to be drained down, the results are often achieved through an uncontrolled, time-consuming, messy and unprofessional performance. Conventional methods for draining down a piping system including cutting into the water line. As the cut pierces the line, water, which may still be under pressure, can shoot out in several directions. As the cut is completed, the water flowing from the pipe can be difficult to control, contain, or direct to a desired location.

When working at a job site, water is often needed. For example, a mason may need a source of water for mixing mortar and this water may not be readily available in a building. There is currently no convenient way to access a water supply piping system to obtain a controlled flow of water.

As can be seen, there is a need for a device that can be used for the controlled drain down of a water supply piping system as well as for creating a source of water from such water supply piping.

SUMMARY OF THE INVENTION

In one aspect of the present invention, a plumbing tool comprises an upper clamp body; a lower clamp body hingedly attached to the upper clamp body; a pipe clamp surface region defined by the upper clamp body and the lower clamp body; a mechanism for securing the upper clamp body closed against the lower clamp body; a main valve body penetrating through the pipe clamp surface region at a location; a pipe seal surrounding the location that the main valve body penetrated through the pipe clamp surface region; a boring shaft movable in the main valve body, the boring shaft operable to press against a pipe disposed inside the upper clamp body and the lower clamp body; and a connector to direct fluid from the pipe out of the main valve body.

In another aspect of the present invention, a plumbing tool comprises an upper clamp body; a lower clamp body hingedly attached to the upper clamp body; a pipe clamp surface region defined by the upper clamp body and the lower clamp body; first and second threaded securing swivel rods swiveling from one of the upper clamp body and the lower clamp body and connecting into a channel formed in the other one of the upper clamp body and the lower clamp body; a main valve body penetrating through the pipe clamp surface region at a location; a pipe seal surrounding the location that the main valve body penetrated through the pipe clamp surface region; a boring shaft movable in the main valve body, the boring shaft operable to press against a pipe disposed inside the upper clamp body and the lower clamp body; a hose connector to direct fluid from the pipe out of the main valve body; and a shut-off valve controlling the flow of fluid out of the main valve body.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a piping system drain down tool that allows for a controlled draining of any pipe or piping system in a safe, efficient and professional manner. Current methods for draining piping systems is messy, time-consuming and uncontrolled. The piping system drain down tool includes a boring shaft that can turn to penetrate a pipe clamped into the tool. A seal prevents water from leaking and directs draining water out through the tool and through a valve and a hose connector, where a hose can be connected to direct flow of the draining water. The tool can also be used to create a water supply tap at any location within a water system.

Figure 1:
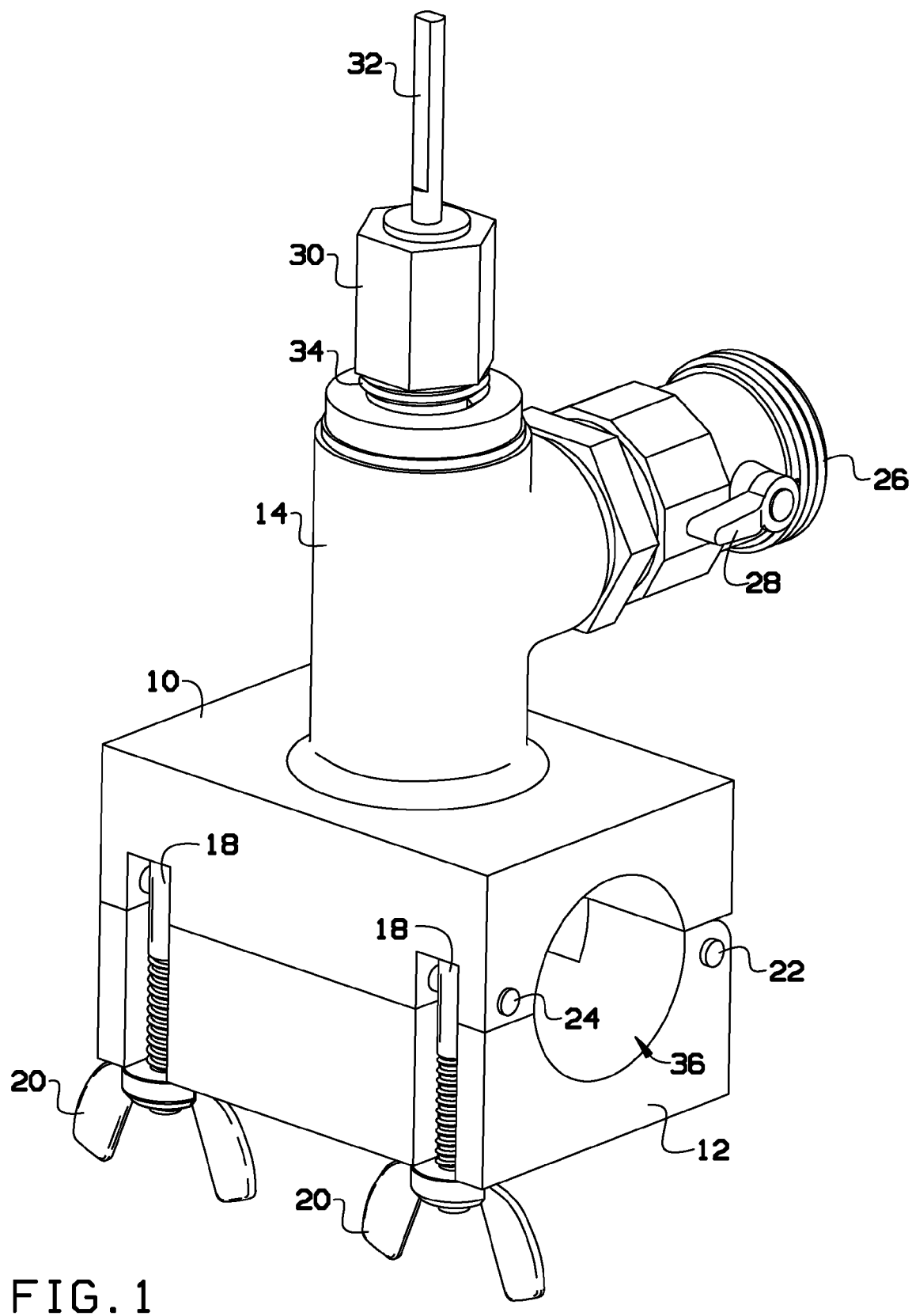
FIG. 1 is a top perspective view of a piping system drain down tool according to an exemplary embodiment of the present invention.
Figure 2:
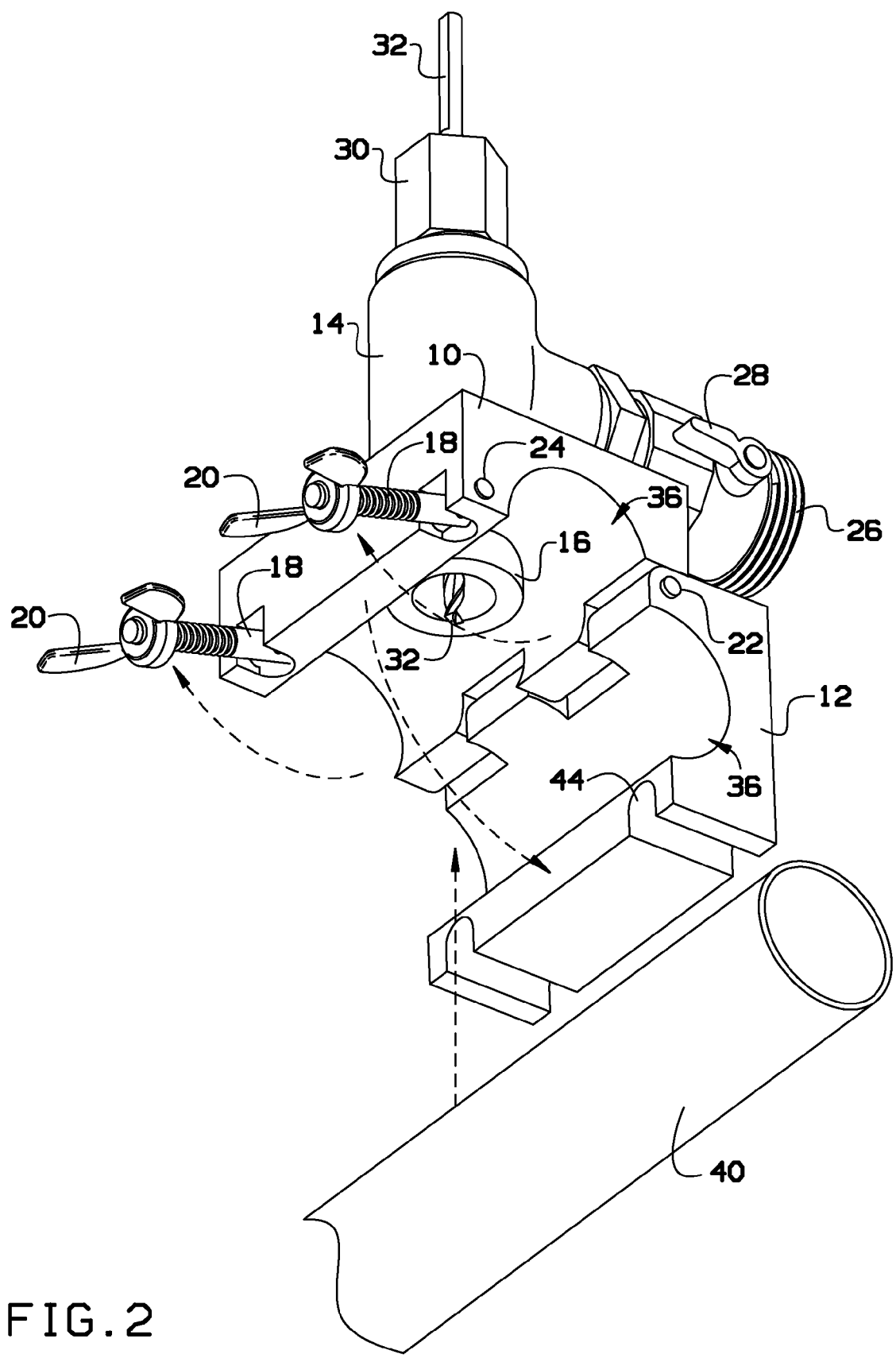
FIG. 2 is a perspective view of the piping system drain down tool of FIG. 1, illustrated in an open configuration showing positioning of a pipe therein.
Figure 3:
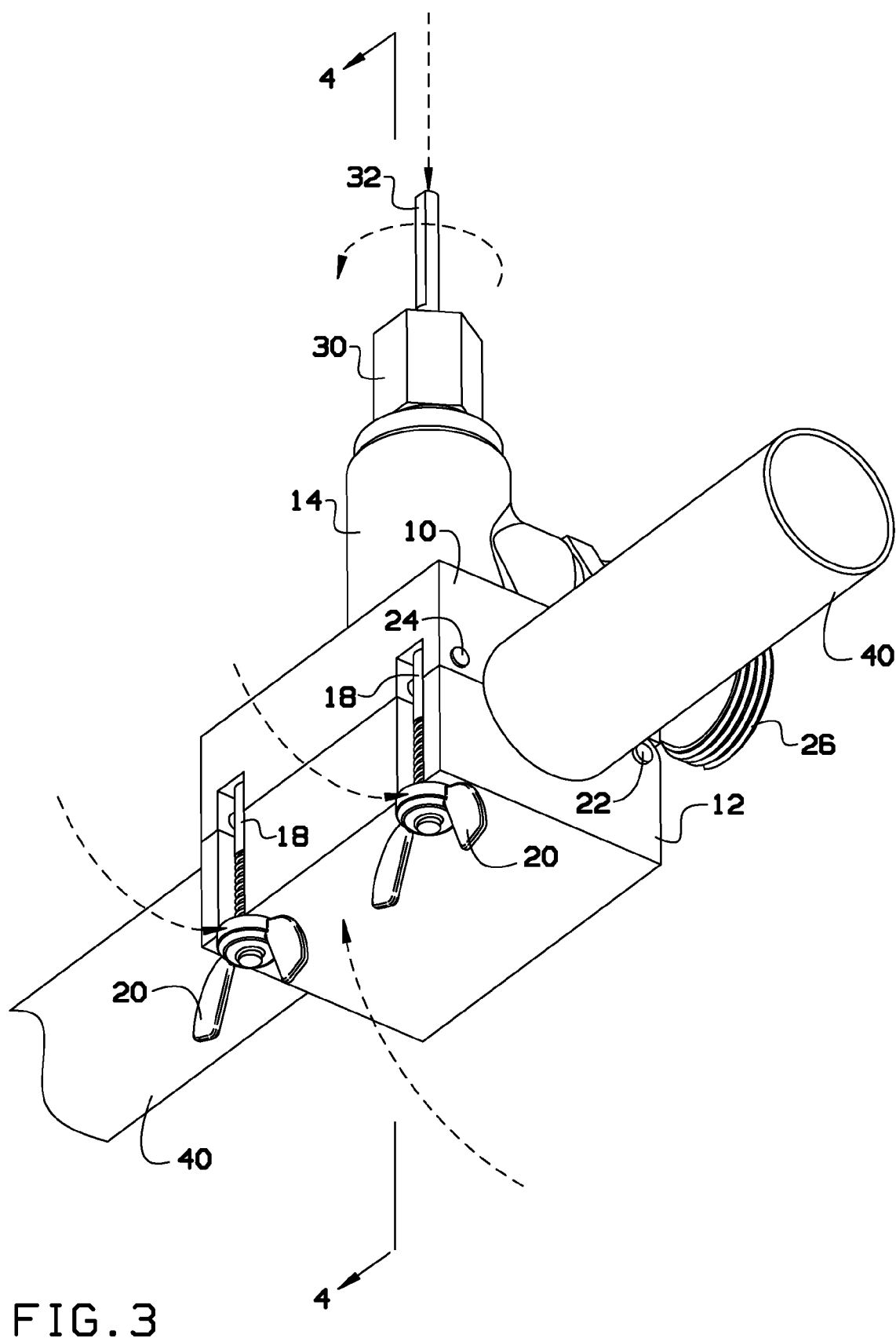
FIG. 3 is a perspective view of the piping system drain down tool of FIG. 1, illustrating an exemplary pipe disposed therein and further illustration turning of a boring shaft to drill into the pipe.
Figure 4:
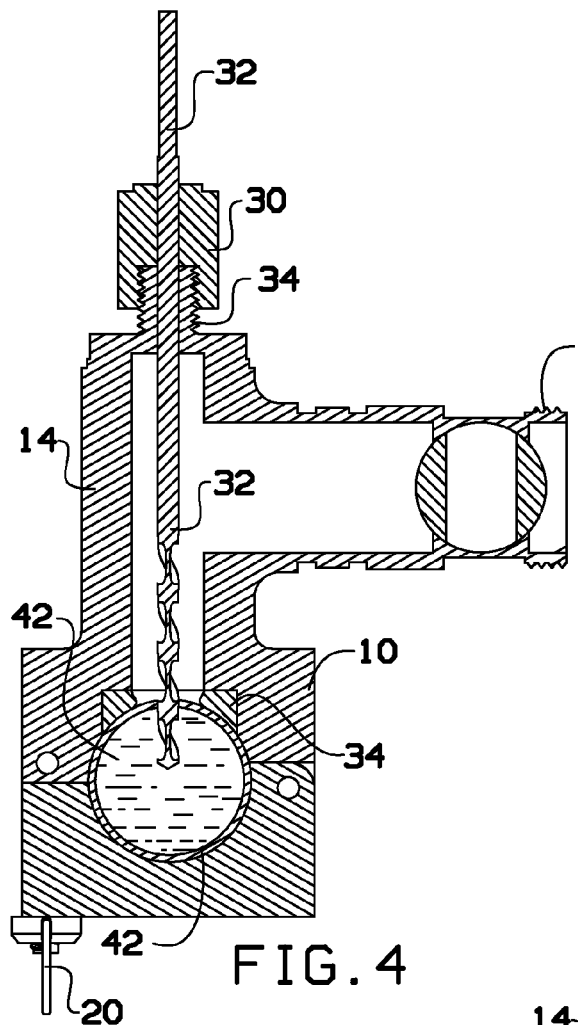
FIG. 4 is a cross-sectional view taken along line 4-4 of FIG. 3, illustrating a boring shaft penetrating through the pipe and the pipe being clamped in the piping system drain down tool of FIG. 1, further illustrating a hose connector valve in a closed position.
Figure 5:
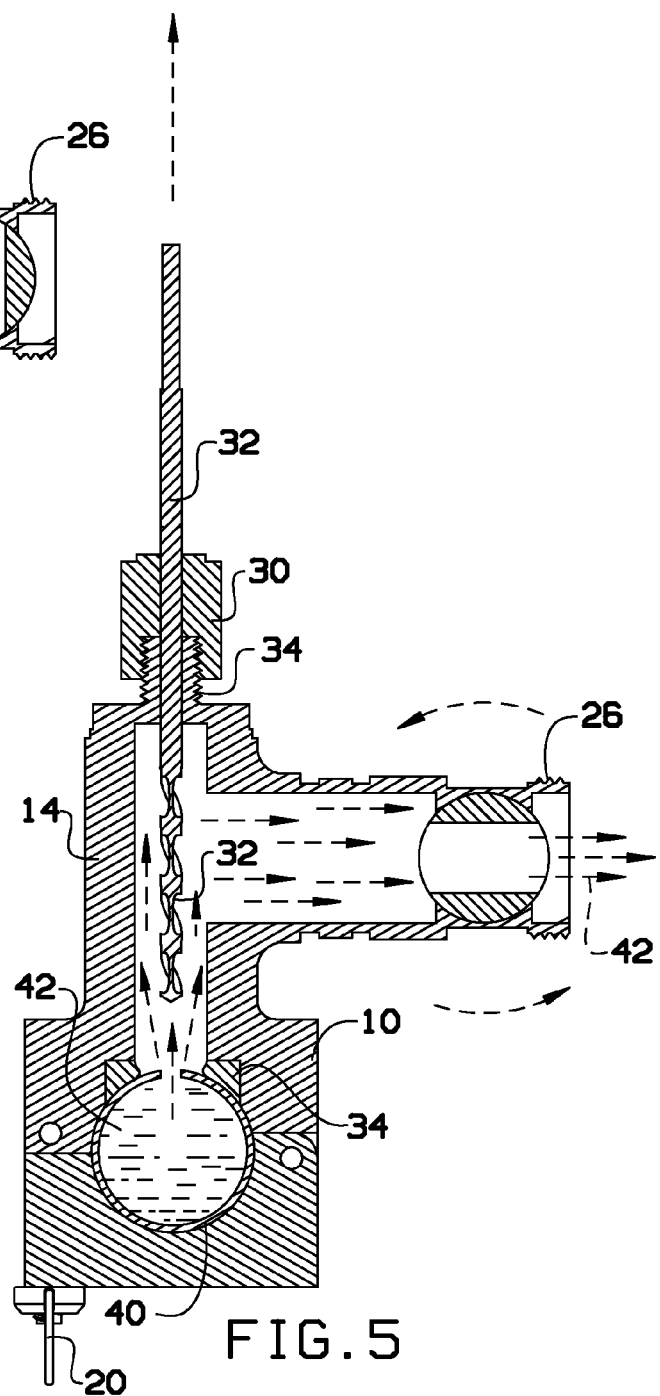
FIG. 5 is a cross-sectional view taken along line 4-4 of FIG. 3, illustrating the boring shaft penetrating and removed from the pipe to permit water to drain out of the pipe and through a hose connector attached thereto with its valve in an open position.

Referring to FIGS. 1 through 5, an upper clamp body 10 can be hingedly connected to a lower clamp body 12. Various hinge types can connect the upper clamp body 10 with the lower clamp body 12. For example, a clamp hinge pin 22 can be used to provide a pivot axis between the upper clamp body 10 and the lower clamp body 12. An inside of the upper clamp body 10 and the lower clamp body 12 includes a pipe clamp surface 36. When the upper clamp body 10 and lower clamp body 12 are closed together (as shown in FIG. 1, for example), the pipe clamp surface 36 forms a generally round shape having an inside diameter that is about the same as an outside diameter of a pipe 40.

A threaded securing swivel rod 18 can pivotably extend from one of the upper clamp body 10 and the lower clamp body 12. Typically, the swivel rod 18 extends from the upper clamp body 10 by a swivel rod hinge pin 24. The swivel rod 18 can swivel into a channel 44 formed in the lower clamp body 12 and wing-nuts (or other such nuts) can secure and tighten the upper clamp body 10 to the lower clamp body 12.

A pipe seal 16 can be disposed on the upper clamp body 10. The pipe seal 16 fluidly connects a main valve body 14 to the inside of the pipe 40 when a hole is cut into the pipe 40 with a boring shaft 32. The boring shaft 32 can move through the main valve body 14 and press against the pipe 40, where turning the boring shaft 32, for example, with a drill or hand crank, can cause the boring shaft 32 to drill into the pipe 40, allowing water 42 to flow out through the hole. Because the hole formed in the pipe is surrounded by the pipe seal 16, water does not leak out through the upper and lower clamp bodies 10, 12.

The boring shaft 32 can be attached to the main valve body 14 with a shaft seal nut 30. A shaft seal 34 can prevent water from leaking out through the boring shaft 32 and shaft seal nut 30.

A hose connector 26 can be fluidly connected to the main valve body 14. The hose connector 26 can include hose threads for removably attaching a hose thereto. A shut-off valve 28 can be disposed either as a component of the hose connector 26, or on the main valve body 14 at the location where the hose connector 26 is attached. The shut-off valve 28 can be used to control the flow of water out of the tool of the present invention.

To use the tool, a user simply wraps the upper clamp body 10 and the lower clamp body 12 around the pipe 40. The swivel rod 18 can be placed in the channels 44 and the nuts 20 tightened to secure the upper and lower clamp bodies 10, 12 about the pipe 40. The boring shaft 32 can be turned and pressed against the pipe to bore a hole therethrough. Water can be drained out of the system and this draining can be controlled with a shut-off valve 28. A hose (not shown) can be attached to the hose connector 26 to drain water to a remote location.

A shaft stop can be provided to prevent the boring shaft 32 from extending to contact the opposite side of the pipe 40. The shaft stop can take various forms. For example, the shaft stop can be a ring disposed on a drill attachment end of the boring shaft 32 so that the boring shaft 32 cannot be slid too deep into the main valve body 14.

While the above describes a hose connector, other connectors can be used here. For example, a normal pipe thread (NPT) connector can be used instead of the hose threads, allowing pipe thread connectors to be used with the tool of the present invention.

The tool of the present invention can be made of one or more various materials. For example, the components can be made from steel, aluminum, brass, copper, chrome, hardened steel, plastic, ABS plastic, Teflon, rubber, and the like.

The tool of the present invention can be designed to attach to various pipe sizes. For example, the tool can have a pipe clamp surface 36 sized for ½, ¾, 1", 1.5", 2" and other sizes of pipe. The boring shaft 32 can be designed for boring holes in various pipe materials. The boring shaft 32 can be designed, for example, for boring through copper, steel, iron, plastic, or the like.

While the above describes a tool for draining water, the tool could be used to drain other systems safely and efficiently. For example, a pressurized gas system could be drained with the tool of the present invention. Of course, in this embodiment, materials should be selected that are compatible with flammable materials.

As described above, the tool of the present invention can be used not only to drain water systems, but also to provide a controllable water source at a desired location. The tool can be attached to provide a temporary water tap that can supply water, for example, for workers on a work site.

It should be understood, of course, that the foregoing relates to exemplary embodiments of the invention and that modifications may be made without departing from the spirit and scope of the invention as set forth in the following claims.

What is claimed is:

1. A plumbing tool comprising:
an upper clamp body and a lower clamp body hingedly attached to the upper clamp body, the plumbing tool comprising a pipe clamp surface region defined by inner surfaces of the upper clamp body and the lower clamp body, the inner surface of the lower clamp body being smooth and free of any projections;
a mechanism for securing the upper clamp body closed against the lower clamp body, the mechanism comprising first and second threaded securing swivel rods swiveling from the upper clamp body and connecting into a channel formed in the lower clamp body;
a main valve body penetrating through the pipe clamp surface region at a location, the main valve body being formed in the upper clamp body;
a pipe seal surrounding the location that the main valve body penetrated through the pipe clamp surface region;
a boring shaft movable within the main valve body, the boring shaft operable to press against a pipe disposed inside the upper clamp body and the lower clamp body;
a hose connector extending laterally from the main valve body, wherein the connector directs fluid from the pipe out of the main valve body; and
a shut-off valve within the hose connector and controlling the flow of fluid out of the hose connector.

2. The plumbing tool of claim 1, further comprising a shaft seal and a shaft seal nut sealing the boring shaft to the main valve body.

3. The plumbing tool of claim 1, further comprising the pipe, wherein the inner surface of the lower clamp body engages an outer surface of the pipe.

4. The plumbing tool of claim 1, wherein the inner surfaces are each concave, the inner surface of the upper clamp body having a continuous radius of curvature that is equal to that of the inner surface of the lower clamp body such that the inner surfaces form a pathway having a circular cross section when the upper clamp body is closed against the lower clamp body.

5. The plumbing tool of claim 1, wherein the boring shaft comprises a shaft stop configured to prevent the boring shaft from translating distally relative to the main valve body passed the shaft stop.

6. The plumbing tool of claim 5, wherein the shaft stop is a ring disposed on a drill attachment end of the boring shaft.

7. The plumbing tool of claim 1, wherein a clamp hinge pin extends through the upper clamp body and the lower clamp body to hingedly attach the upper clamp body with the lower clamp body such that the upper clamp body is pivotable relative to the lower clamp body about the clamp hinge pin.

8. The plumbing tool of claim 1, wherein:
a first swivel pin extends through the first threaded securing swivel rod and a second swivel pin extends through the second threaded securing swivel rod, the first and second swivel pins extending through the upper clamp body such that the first and second threaded securing swivel rods are pivotable about the first and second swivel pins.

9. The plumbing tool of claim 8, wherein the first swivel pin is coaxial with the second swivel pin and the first swivel pin is spaced apart from the second swivel pin.

10. The plumbing tool of claim 1, wherein:
the boring shaft defines a longitudinal axis; and
the first and second threaded securing swivel rods each extend parallel to the longitudinal axis when the upper clamp body is closed against the lower clamp body.

11. The plumbing tool of claim 1, wherein:
the boring shaft defines a longitudinal axis; and
the channels each extend parallel to the longitudinal axis when the upper clamp body is closed against the lower clamp body.

12. The plumbing tool of claim 1, wherein:
the boring shaft defines a longitudinal axis; and
the channels extend through opposite top and bottom surfaces of the lower clamp body that each extend perpendicular to the longitudinal axis when the upper clamp body is closed against the lower clamp body.

13. The plumbing tool of claim 1, wherein:
the upper clamp body comprises an opening;
the main valve body is directly coupled to the upper clamp body, the main valve body comprising a first portion that defines a longitudinal axis and a second portion that extends perpendicular to the longitudinal axis, the first portion comprising a passageway that is in communication with the opening and the second portion comprising a lumen that is in communication with the passageway; and
the hose connector is directly coupled to the second portion, the hose connector comprising a conduit that is in communication with the lumen.

14. The plumbing tool of claim 13, wherein the main valve body is monolithic.

15. The plumbing tool of claim 13, wherein the main valve body is monolithically formed with the upper clamp body.

16. The plumbing tool of claim 15, further comprising a shaft seal and a shaft seal nut sealing the boring shaft to the main valve body, the shaft seal nut being coupled directly to the main valve body.

17. A plumbing tool comprising:
an upper clamp body and a lower clamp body hingedly attached to the upper clamp body, the plumbing tool comprising a pipe clamp surface region defined by the upper clamp body and the lower clamp body;
a mechanism for securing the upper clamp body closed against the lower clamp body the mechanism comprising first and second threaded securing swivel rods swiveling from the upper clamp body and connecting into a channel formed in the lower clamp body;
a main valve body penetrating through the pipe clamp surface region at a location, the main valve body being formed in the upper clamp body;
a pipe seal surrounding the location that the main valve body penetrated through the pipe clamp surface region;
a boring shaft movable within the main valve body, the boring shaft operable to press against a pipe disposed inside the upper clamp body and the lower clamp body, the boring shaft comprising a shaft stop configured to prevent the boring shaft from translating distally relative to the main valve body passed the shaft stop;
a hose connector extending laterally from the main valve body, wherein the connector directs fluid from the pipe out of the main valve body; and
a shut-off valve within the hose connector and controlling the flow of fluid out of the hose connector.

18. A plumbing tool comprising:
an upper clamp body comprising an opening and a lower clamp body, the plumbing tool comprising a pipe clamp surface region defined by inner surfaces of the upper clamp body and the lower clamp body, the inner surface of the lower clamp body being smooth and free of any projections;
a clamp hinge pin extending through the upper clamp body and the lower clamp body such that the upper clamp body is pivotable relative to the lower clamp body about the clamp hinge pin;
a mechanism for securing the upper clamp body closed against the lower clamp body, the mechanism comprising first and second threaded securing swivel rods each swiveling from the upper clamp body and connecting into a channel formed in the lower clamp body, wherein a first swivel pin extends through the first threaded securing swivel rod and a second swivel pin that is spaced apart from the first swivel pin extends through the second threaded securing swivel rod, the first and second swivel pins extending through the upper clamp body such that the first and second threaded securing swivel rods are pivotable about the first and second swivel pins, the inner surfaces each being concave, the inner surface of the upper clamp body having a radius of curvature that is equal to that of the inner surface of the lower clamp body such that the inner surfaces form a pathway having a circular cross section when the upper clamp body is closed against the lower clamp body;
a monolithic main valve body penetrating through the pipe clamp surface region at a location, the main valve body being directly coupled to the upper clamp body, the main valve body comprising a first portion that extends parallel to the longitudinal axis and a second portion that extends perpendicular to the longitudinal axis, the first portion comprising a passageway that is in communication with the opening and the second portion comprising a lumen that is in communication with the passageway;
a pipe seal surrounding the location that the main valve body penetrated through the pipe clamp surface region;
a boring shaft defining a longitudinal axis, the boring shaft being movable within the main valve body, the boring shaft operable to press against a pipe disposed inside the upper clamp body and the lower clamp body, the boring shaft comprising a shaft stop configured to prevent the boring shaft from translating distally relative to the main valve body passed the shaft stop, the shaft stop being a ring disposed on a drill attachment end of the boring shaft;
a shaft seal and a shaft seal nut sealing the boring shaft to the main valve body, the shaft seal nut being coupled directly to the main valve body;
a hose connector extending laterally from the main valve body, wherein the connector directs fluid from the pipe out of the main valve body, the hose connector being directly coupled to the second portion, the hose connector comprising a conduit that is in communication with the lumen; and
a shut-off valve within the hose connector and controlling the flow of fluid out of the hose connector,
wherein the channels each extend parallel to the longitudinal axis when the upper clamp body is closed against the lower clamp body, the channels each extending through opposite top and bottom surfaces of the lower clamp body that each extend perpendicular to the longitudinal axis.

* * * * *